(12) United States Patent
Yagel et al.

(10) Patent No.: US 6,324,275 B1
(45) Date of Patent: Nov. 27, 2001

(54) SYSTEM AND METHOD FOR TOTAL TELECOMMUNICATIONS SERVICE COMMISSIONING

(75) Inventors: Scott M. Yagel, McKinney; Mark A. Peterson, Coppell; Ronald L. Ward, Flower Mound; Nancy M. Korman, Plano, all of TX (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 08/861,498

(22) Filed: May 22, 1997

(Under 37 CFR 1.47)

Related U.S. Application Data (60) Provisional application No. 60/018,622, filed on May 23, 1996, and provisional application No. 60/018,306, filed on May 24, 1996.

(51) Int. Cl.[7] .............................. H04M 3/42; G06F 9/00; G06F 9/46; G06F 15/163; G06F 19/00

(52) U.S. Cl. .................................. 379/201.03; 379/201.05; 379/201.12; 379/207.02; 379/221.08; 700/99; 709/104; 709/315

(58) Field of Search ....................... 364/468.05; 379/201, 379/207, 230, 269, 201.01, 201.02, 201.03, 201.05, 201.12, 207.02, 221.08, 221.09, 221.1, 221.11, 221.12; 395/182.02, 200.35, 500, 527, 680, 683; 700/99; 703/23, 24, 26, 27; 709/104, 310, 315

(56) References Cited

U.S. PATENT DOCUMENTS

| | | |
|---|---|---|
| 5,241,588 | 8/1993 | Babson, III et al. ................. 379/201 |
| 5,481,601 | 1/1996 | Nazif et al. ........................... 379/207 |
| 5,526,415 * | 6/1996 | Wakamoto ............................ 379/230 |
| 5,933,489 * | 8/1999 | Sensabaugh et al. ............ 379/207 X |
| 6,038,301 * | 3/2000 | Nightingale ......................... 379/201 |
| 6,085,175 * | 5/2000 | Schultz ................................. 379/201 |
| 6,178,438 * | 1/2001 | Tschirhart et al. ............... 379/201 X |

FOREIGN PATENT DOCUMENTS

| | | | |
|---|---|---|---|
| 9406232 | 3/1994 | (WO) | ............................. H04L/12/24 |
| 9523469 | 8/1995 | (WO) | ............................. H04L/12/24 |
| 9534975 | 12/1995 | (WO) | ............................. H04L/12/24 |
| 9405112 | 3/1994 | (WO) | ............................. H04M/11/00 |
| 9211724 | 7/1992 | (WO) | ............................. H04M/3/42 |
| 9523483 | 8/1995 | (WO) | ............................. H04Q/3/00 |
| 9529564 | 11/1995 | (WO) | ............................. H04Q/3/00 |

OTHER PUBLICATIONS

J. Allen, "An Environment for Rapid Service Development", Institution of Electrical Engineers, Apr. 18, 1993, pp. 211–216.

(List continued on next page.)

*Primary Examiner*—Harry S. Hong
(74) *Attorney, Agent, or Firm*—Baker Botts L.L.P.

(57) ABSTRACT

A system and method (10) for commissioning telecommunications services includes an SLP toolkit (13) for building a service logic program (15), and an SPM toolkit (19) for building a service management program (21), where the service management program (21) implements a support service for the service logic program (15). A distribution network node (16) is used to receive and distribute the service logic program (15) and service management program (21) to a service logic execution environment (20, 92) residing in a telecommunications network node (30, 32, 34, 36, 50) for executing the service logic program (15), and to a management logic execution environment (22, 86, 94, 102) for executing the service management program (21).

38 Claims, 4 Drawing Sheets

OTHER PUBLICATIONS

M.G. Ryan, "The Intelligent Network Management Dilemma: Is There a Solution?", Annual Review of Communications, vol. 47, Jan. 1, 1993, pp. 416–419.

J.O. Bergholm, et al., "Service Design and Inventory System—An Object–Oriented Reusable Software Asset", AT&T Technical Journal, vol. 75, No. 2, Apr. 1, 1996, pp. 47–57.

J.C. Pennanec'h, "Intelligent Network Software Factory for Service Creation and Modification", Electrical Communication, vol. 63, No. 4, Jan. 1, 1989, pp. 345–355.

T. Magedanz, "A Preliminary Model for an Intelligent Network Management Support System", Institute of Electrical and Electronics Engineers, vol. 1 of 4, Jun. 14, 1992, pp. 169–173.

A. Hermann, et al., "PHAMOS–Philips Advanced Management and Operations System–Functionality and Architecture", Philips Telecommunication Review, vol. 51, No. 1, Mar. 1, 1993, pp. 30–42.

I. Yoda, et al., "Object Oriented TMN Based Operations Systems Development Platform", IEEE, 1994, pp. 1824–1829.

I. Yoda, et al., "Methods for Constructing a Management Information Base (MIB) in Transmission Network Operations", Electronics and Communications in Japan, vol. 76, No. 9, Sep. 1, 1993, pp. 21–33.

PCT Search Report(s) dated Feb. 9, 1998 and dated Feb. 16, 1998.

* cited by examiner

SYSTEM AND METHOD FOR TOTAL TELECOMMUNICATIONS SERVICE COMMISSIONING

RELATED PATENT APPLICATIONS

This patent application claims the benefit of provisional U.S. patent applications "System and Method for Telecommunications Service Commissioning", application Ser. No. 60/018,622, filed on May 23, 1996, and "System and Method for Total Telecommunications Service Commissioning", application Ser. No. 60/018,306, filed on May 24, 1996.

This application is related to U.S. patent application Ser. No. 08/861,497, "System and Method for Supporting and Managing Telecommunications Services", filed on May 22, 1997, which also claims the benefit of U.S. Provisional Application No. 60/018,306, "System and Method for Telecommunications Service Commissioning", filed on May 23, 1996 and U.S. Provisional Application No. 60/018,306, "System and Method for Total Telecommunications Service Commissioning", filed on May 24, 1996.

TECHNICAL FIELD OF THE INVENTION

This invention is related in general to the field of telecommunications. More particularly, the invention is related to a system and method for total telecommunications service commissioning.

BACKGROUND OF THE INVENTION

In the current telephony environment, when a telecommunications services provider desires to provide a new service to its telephone customers, only the telecommunications equipment manufacturer and vendor has the knowledge and expertise to develop and deploy the new service. Because past and current telecommunications system architecture and implementation, the deployment of new services is a slow and time-consuming process. With the advent of the Intelligent Network (IN) and Advanced Intelligent Network (AIN), which include a provisioning of a service creation environment (SCE), new service definitions may be readily created and provided to the service control point (SCP) for execution, and to the service management system (SMS) for management. However, there are many other business functions related to service deployment that lag behind. For example, the billing, sales, marketing, and customer support departments all require the capability to support the new service in the same rapid manner to fully deploy the newly-created services.

SUMMARY OF THE INVENTION

Accordingly, it is desirable to provide for a total commissioning of telecommunications services, from the specification of the service logic and data, to the specification of the information and logic necessary to manage and support the services.

In one aspect of the invention, a system for commissioning telecommunications services includes a first toolkit for building a service logic program, and a second toolkit for building a service management program, where the service management program implements a support service for the service logic program. A distribution network node is used to receive and distribute the service logic program and service management programs to (i) a service logic execution environment residing in a telecommunications network node that executes the service logic program and (ii) a management logic execution environment for executing the service management program.

In another aspect of the invention, a method for commissioning telecommunications services includes the steps of building a service logic program, and building a service management program, where the service management program implements a support service for the service logic program. Then distributing the service logic program and service management program to at least one service logic execution environment residing in a telecommunications network node and to at least one management logic execution environment, where they are executed, respectively.

A technical advantage of the present invention is the ability to rapidly design, create, and deploy new services in the telecommunications network to meet the needs of the network, front office systems, and back office systems.

BRIEF DESCRIPTION OF THE DRAWINGS

For a better understanding of the present invention, reference may be made to the accompanying drawings, in which.

DETAILED DESCRIPTION OF THE INVENTION

Figure 1:
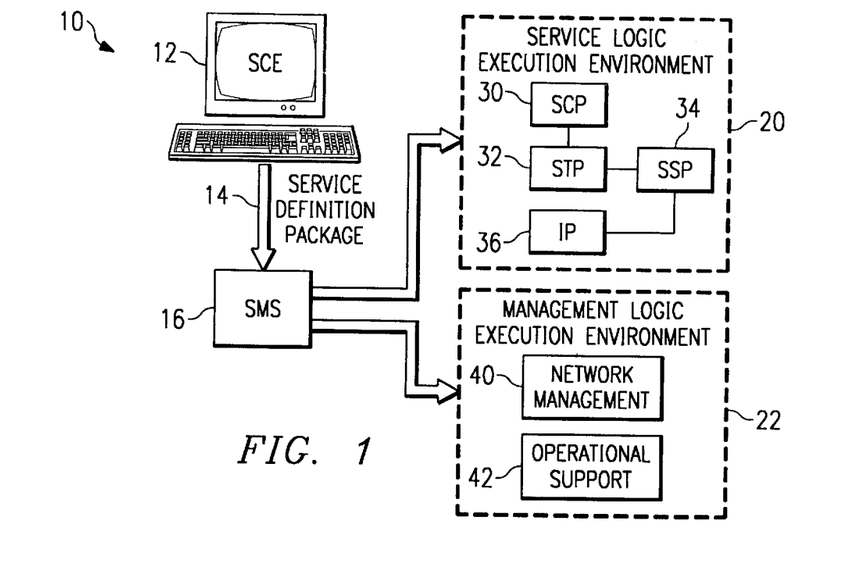
FIG. 1 is a simplified block diagram illustrating the concept of total service commissioning according to the teachings of the present invention.

Referring to FIG. 1, which is a simplified block diagram illustrating the concept of total service commissioning according to the teachings of the present invention, total service commissioning system 10 augments the role of a service creation environment to a service commissioning environment (SCE) 12, so that newly added services are fully deployed functionally as well as deployed with full support and management. Service commissioning environment (SCE) 12 is a collection of toolkit applications running on an engineering workstation or other suitable computing environment. Service commissioning environment 12 provides a capability for creating new services from reusable components, testing the new services, verifying the logic, and deploying the new services.

Further, service commissioning environment 12 provides toolkits for creating the logic, data, and templates to support and manage the new services. The new service logic, support and management information are collected in a service definition package created in service commissioning environment 12. Service definition package 14 is transmitted to a Service Management System (SMS) 16 node in the telecommunications network for management functions. Service Management System 16 serves as a network distribution node which distributes service definition package 14 to a service logic execution environment 20 and a management logic execution environment 22. Service logic execution environment 20 may reside on a number of telecommunication network nodes, including nodes in an Intelligent Network (IN) or Advanced Intelligent Network (AIN): Service Control Point (SCP) 30, Service Transfer Point (STP) 32, Signal Switching Point (SSP) 34, and Intelligent Peripheral (IP) 36. Typically, Service Control Point 30 is the service intelligence for the Advanced Intelligent Network and contains the logic and data used to provide advanced services. Service Transfer Point 32 supports the transfer of control messages between Service Control Point 30 and Signal Switching Point 34 using the Signaling System No. 7 (SS7) network. Signal Switching Point 34 is the interface to the service subscriber or caller and is capable of recognizing when a particular call requires Intelligent Network services. Intelligent Peripheral 36 typically contains the functionality and resources for exchanging information with the caller, such as playing voice announcements and collecting dual tone multifrequency (DTMF) digits. The telecommunications services defined in service definition package 14 are thus carried out in service logic execution environment 20 residing in these Advanced Intelligent Network components.

Service definition package 14 is further provided by Service Management System 16 to management logic execution environment 22, which may include network management systems 40 and operational support systems 42. Service definition package 14 contains the necessary logic and data to allow management logic execution environment 22 to provide front and back office functions to support the services executed in service logic execution environment 20.

Figure 2:
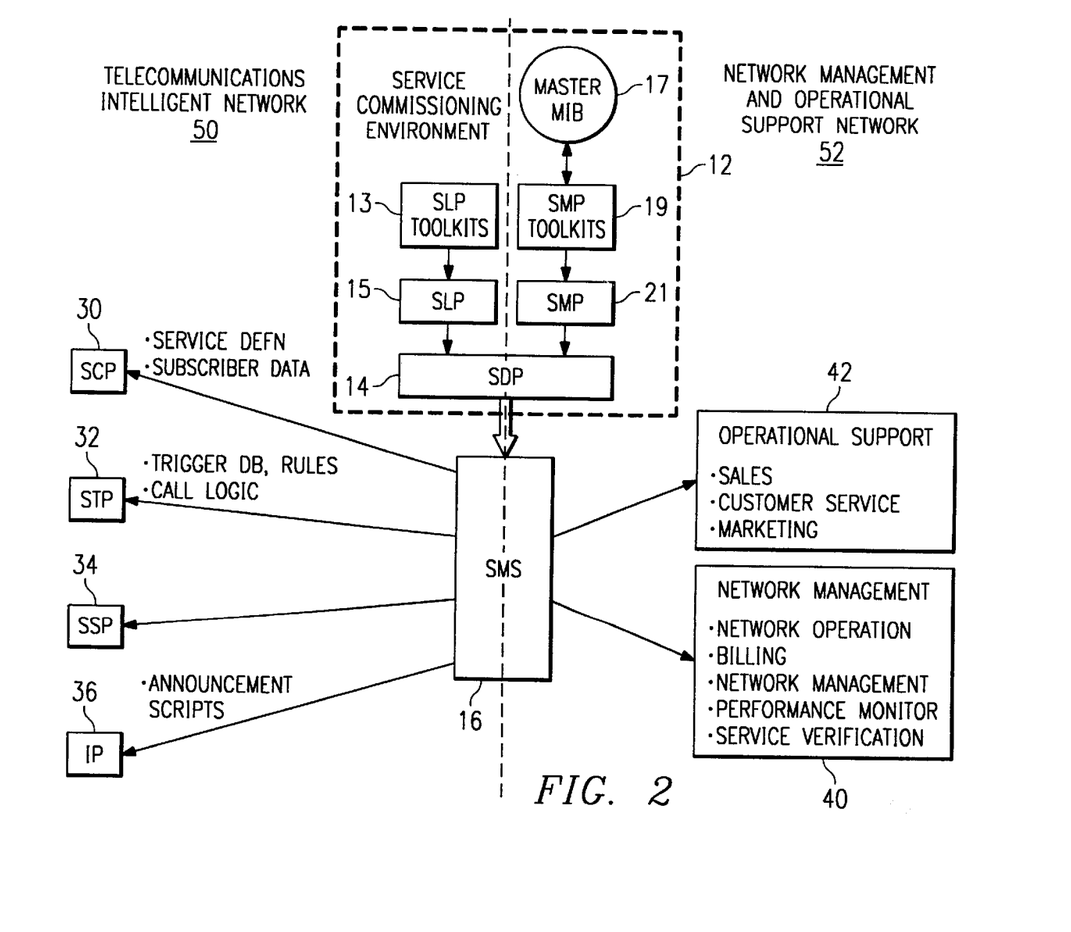
FIG. 2 is a more detailed block diagram illustrating the concept of total service commissioning according to the teachings of the present invention.

Referring to FIG. 2, which is a more detailed block diagram illustrating the concept of total service commissioning according to the teachings of the present invention, Service Commissioning Environment 12 includes Service Logic Program (SLP) toolkits 13 for creating service logic programs 15. Service Commissioning Environment 12 further includes a master management information base (MIB) 17 which is a collection of object definitions modeling the resources in the telecommunications network and business systems. Service Management Program (SMP) toolkits 19 have access to master management information base 17 to create service management programs that support and manage the services specified in service logic programs 15. Service logic programs 15 and service management programs 21 are combined into service definition package 14, which is provided to Service Management System 16. Service Management System 16 may serve as a central distribution point which then transmits service definition package 14 or selected portions thereof to nodes in a telecommunications network 50 such as an Intelligent Network or Advanced Intelligent Network. One or more other network nodes may also service this distribution function. Service definitions and subscriber data may be transmitted to databases residing in Service Control Point 30 to modify or add to the data stored therein. Service definition package 14 may also include a trigger database and rules and call logic, which are provided to Signal Transfer Point 32 and Signal Switching Point 34. Further, Intelligent Peripheral 36 may receive announcement scripts defined in service definition package 14.

Service Management System 16 may also serve as the distribution point for transmitting management logic, data, templates, and other information to network management and operational support networks 40 and 42, respectively. For example, customer service data, service order information, marketing and sales information may be provided to operational support systems 42 in the front office which support sales and marketing of subscriptions to the new service and customer service. Further, information such as billing information, network management code and data, performance monitoring metrics and specifications may be provided by Service Management System 16 to network management systems 40 to the back office for supporting operations of the network, billing, and network management and monitoring.

Figure 3:
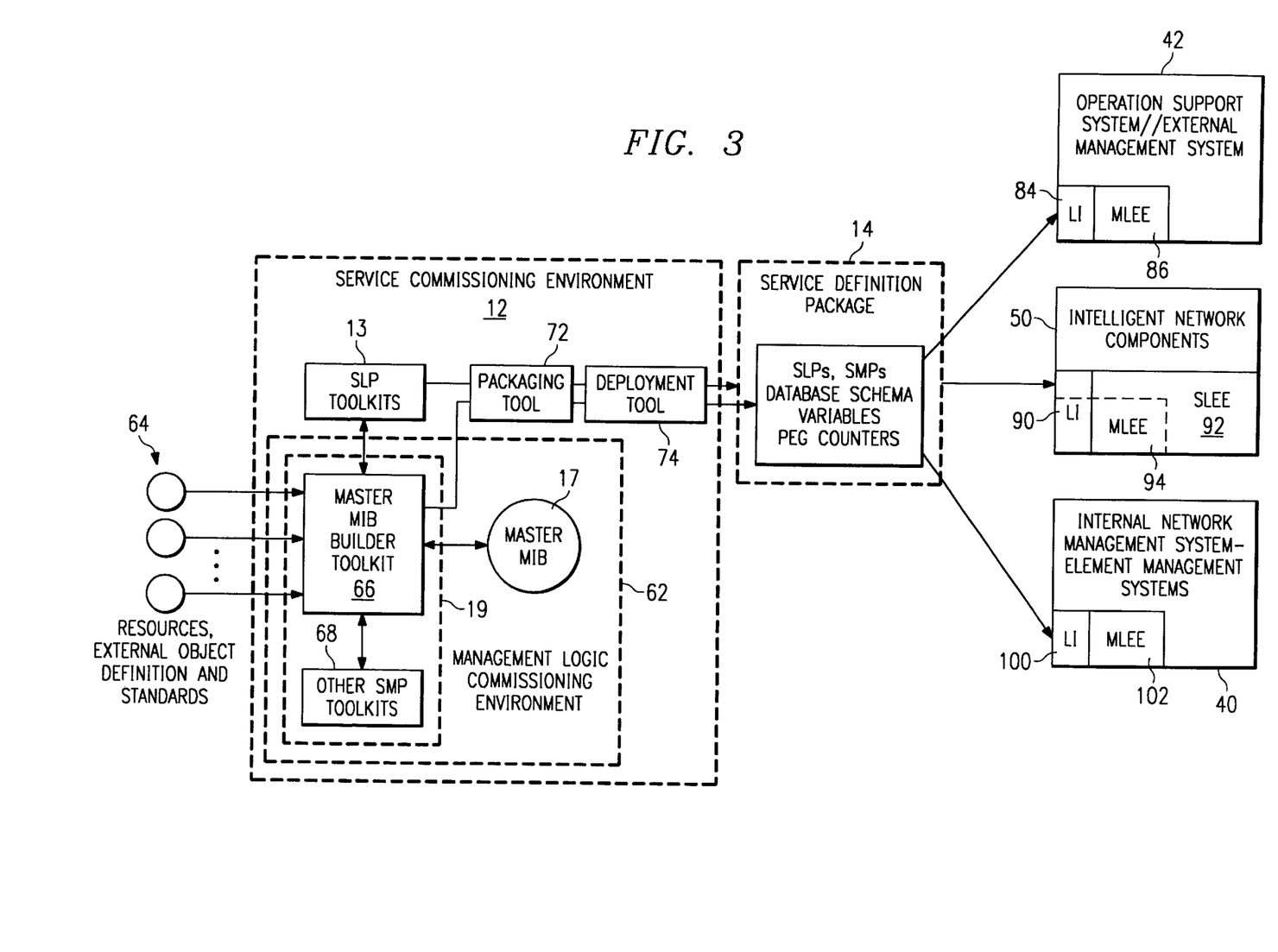
FIG. 3 is a block diagram of total service commissioning using a number of toolkits including a master management information base builder for building a master management information base according to the teachings of the present invention.

FIG. 3 is a block diagram of total service commissioning using a number of toolkits including a master management information base builder for building a master management information base according to the teachings of the present invention. Service Commissioning Environment 12 includes a number of service log program toolkits 13 which may be used to generate service logic programs and database schema describing the structure in which data are stored. An intuitive visual programming language and a library of reusable objects or service independent building blocks and templates may be manipulated in a service logic editor to specify service logic flow and data parameters.

Service commissioning environment 12 further includes a management logic commissioning environment (MLCE) 62, which includes a master management information base builder toolkit 66, management logic commissioning environment toolkits 68, and a master management information base 70. Management logic commissioning environment toolkits 68 are used to generate service management programs which provide support and management functions for the deployed services. Service management programs may include agent processes and manager processes, where the manager process directs the agent processes to perform particular functions upon an object that affects the underlying network resource that the object models. Both manager and agent processes have access to a master information base 70. Service management programs may include process flows, processes specified by linked service independent building blocks, rules, and other logic expressions.

Master management information base 70 is a repository of managed objects which abstractly model or describe the properties and behavior of physical and logical resources of network elements in the telecommunications network. Physical resources, for example, include the printed circuit boards, processors, disks, and power supplies that are grouped together to form part or all of a physical network element. Logical resources include the software applications, and concepts such as "circuit" or "link", that have properties but are not physical in nature. Resources within a service provider network can thus be modeled as objects with object-oriented methodologies in an object-oriented framework. The object definition for a resource includes a definition of its attributes, behaviors, methods, and relationships between it and other objects.

Service commissioning environment 12 further includes a packaging tool 72 and a deployment tool 74 which packages the service logic programs, service management programs, database schema, variables, peg counters, and other information into a service definition package 80. Service definition package 80 is provided to network and element management systems 40, operational support and management systems 42, and Intelligent Network components 50. Network and element management systems 40 and operational support and management systems 42 both include logic interpreters (LI) 84 and 100, which may reside in respective management logic execution environments 86 and 102. Logic interpreters 84 and 100 interpret the service management programs which may be expressed in an interpreted language. Further, Intelligent Network components 50 may include logic interpreter 90, a service logic execution environment 92, and a management logic execution environment 94 for interpreting service logic programs, service management programs, and executing the interpreted logic.

Figure 4:
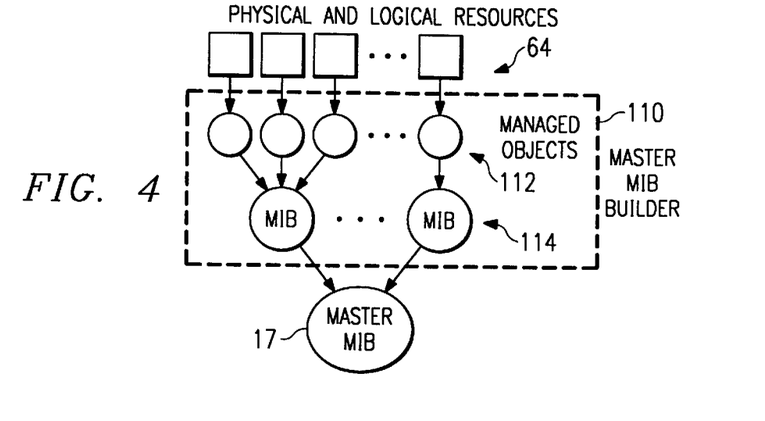
FIG. 4 is a simplified block diagram illustrating the construction of the master management information base according to the teachings of the present invention.

FIG. 4 is a simplified block diagram illustrating the construction of the master management information base according to the teachings of the present invention. Physical and logical resources 64 in the network elements or components are abstractly modeled and described by managed objects 112 in an object-oriented framework. The modeling and definition process may be facilitated by the master managed information base builder 110. Collections or repositories of managed objects 112 may be formed into managed information bases 114. In turn, collections of managed information bases are formed into a master management information base 116, which is the master specification of network object behaviors and properties. The master specification can be used to derive different forms of object definitions depending upon the requirements or the operation support system. For example, the master specification may be used to derive:

A C++ object definition;

A SmallTalk object definition;

An International Telecommunications Union (ITU) standards compliant description for Telecommunications Management Network (TMN);

An Internet Engineering Task Force (IETF) complaint description for Telecommunications Management Network networks;

Agent application logic;

Manager application logic; and

Graphical user interface applications for object attribute modification and display.

In order to effectively manage a multi-vendor, multi-service network, management information bases are needed to provide description of the network resources. There are many standards bodies and industry consortia that may specify information that may be incorporated in management information bases 120 and 122 in FIG. 5, which is a simplified block diagram of the master management information base builder according to the teachings of the present invention. The standards bodies and industry consortia include:

1. International Telecommunications Union (ITU)
2. Internet Engineering Task Force (IETF)
3. Network Management Forum (NMF)
4. ATM Forum
5. SONET Interoperability Forum (SIF)
6. SONET Interoperability Forum (SIF)
7. Bellcore
8. European Telecommunications Standards Institute (ETSI)

Figure 5:
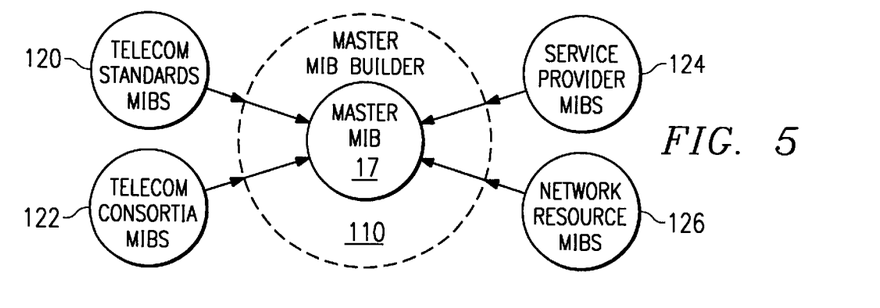
FIG. 5 is a simplified block diagram of the master management information base builder according to the teachings of the present invention.
Figure 6:
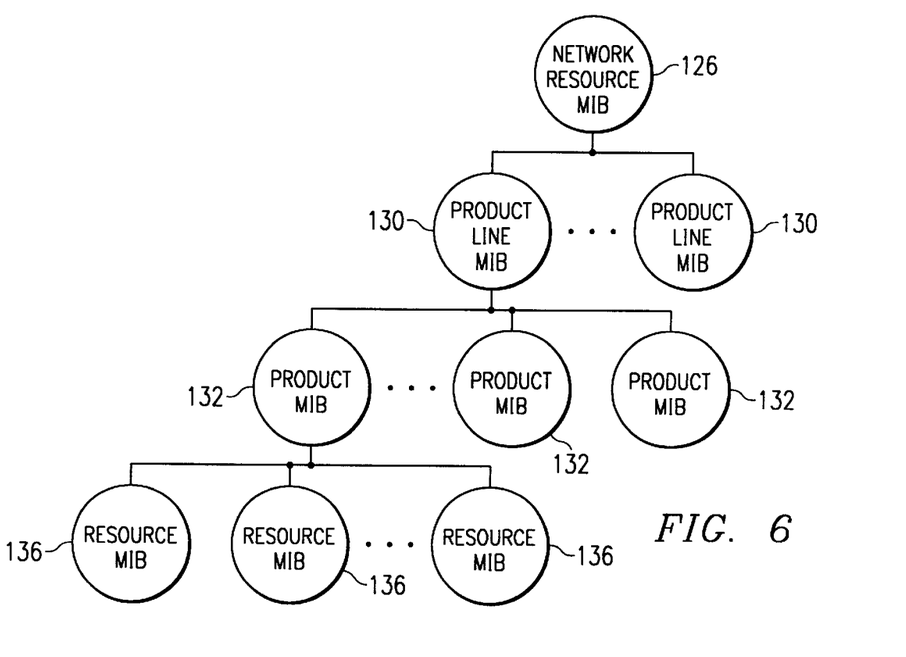
FIG. 6 is a simplified diagram illustrating the hierarchical structure of the master management information base.

These organizations are typically made up of governmental standard setting organizations, and/or equipment manufacturers. Since the recommendations generated by the organizations are designed to cover a wide variety of services and products, they are typically general in scope. Thus, in addition to the more general management information bases defined or generated based on recommendations from these organizations, more specific service provider management information bases 124 may be specified by telecommunications service providers. Network resource management information bases 126 may be specified by equipment manufacturers that describe their specific service needs and products. For example and referring to FIG. 6, which is a simplified diagram, illustrating the hierarchical structure of the master management information base. An equipment manufacturer may develop a management information base 126 that defines the unique behavior of the resources contained in its products 132, higher-level management information bases that define the common objects within its products and product lines 130, and product specific management information bases 136 that define the resources unique to each product.

Figure 7:
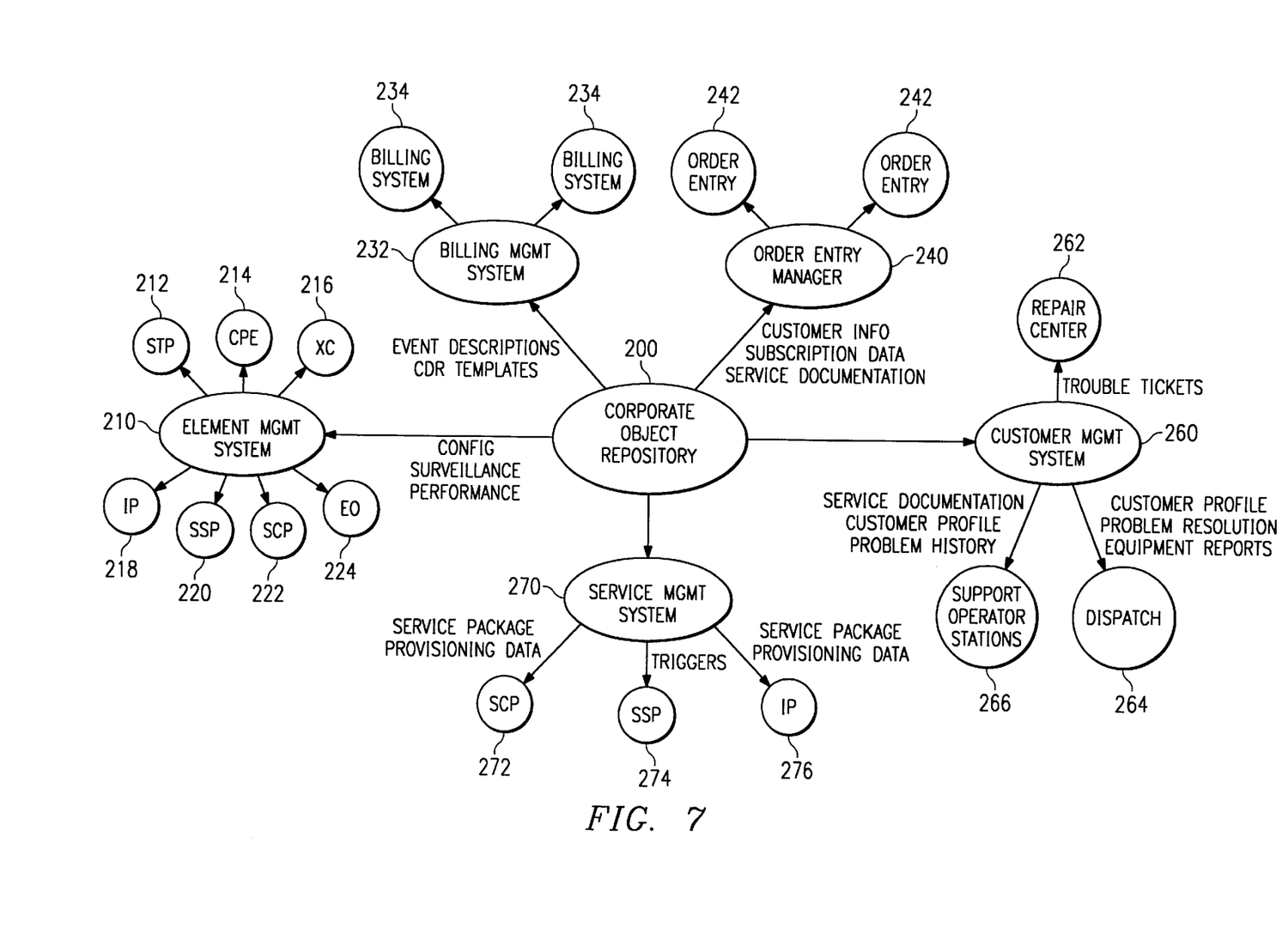
FIG. 7 is a simplified diagram of an object-oriented view of the master management information base.

Referring to FIG. 7, a more detailed object-oriented view of the master management information base shown as a corporate object repository 200 is provided. Corporate object repository 200 includes objects modeling a service provider's network management and support systems and interface thereto, from which more specific objects may inherit behavior and data structures to derive more specific or unique management and support systems with added behavior and data structures. Element management system objects 210 may be derived from object definitions specified in corporate object repository 200 with provisions for configuration, surveillance, performance monitoring, and other network management functions. Element management system objects 210 are further used to derived specific management and interface objects for signal transfer point 212, customer premises equipment (CPE) 214, cross-connects 216, Intelligent Peripherals 218, Signal Switching Point 220, Service Control Point 222, and end office (EO) 224. Specific billing management system objects 232 have provisions for event descriptions for which billing is needed and call detail record (CDR) templates, for example. From billing management system objects 232 specific objects for billing systems 234 may be derived by inheritance.

Order entry manager objects 240 have provisions for customer information, subscription data, and service documentation inherited from objects defined in corporate object repository 200. Further specific order entry system and interface objects 242 may be derived by inheriting methods and data from order entry manager objects 240. Customer management system and interface objects 260 may be derived from objects defined in corporate object repository 200. Objects for modeling a repair center 262, service dispatch 264, support operator stations 266, and interfaces thereto may be derived by inheritance from customer management system objects 260. Further, Service Management System objects 270 may be derived from objects defined in corporate object repository 200 to further derive management objects and interfaces for Service Control Point 272, Signal Switching Point 274, Intelligent Peripheral 276, and other network nodes.

Thus, service commissioning environment 10 enhances the role of the Service Creation Environment to provide enough information about a service such that all management functions for that service can be derived from the definition of the service. Service commissioning system and method according to the teachings of the present invention extends the definitions of the service specification to include management logic and management parameters to meet the needs of all management software.

What is claimed is:

1. A system for commissioning telecommunications services, comprising:
   an SLP toolkit for building a service logic program;
   an SMP toolkit for building a service management program, the service management program implementing a support service for the service logic program;
   a distribution network node for receiving and distributing the service logic program and service management program;
   a service logic execution environment, residing in a telecommunications network node, for receiving and executing the service logic program; and
   a management logic execution environment for receiving and executing the service management program.

2. The system, as set forth in claim 1, further comprising a packaging tool for packaging the service logic program and service management program into a service definition package for transmission to the distribution network node.

3. The system, as set forth in claim 2, further comprising a deployment tool for downloading the service definition package to the distribution network node.

4. The system, as set forth in claim 1, further comprising a deployment tool for downloading the service logic program and service management program to the distribution network node.

5. The system, as set forth in claim 1, wherein the service logic program comprises a database schema defining a database structure for data to be operated on by the service logic program in the service logic execution environment.

6. The system, as set forth in claim 1, wherein the distribution network node is a service management system.

7. The system, as set forth in claim 1, wherein the service logic execution environment comprises a service logic interpreter for interpreting the service logic program.

8. The system, as set forth in claim 1, wherein the service logic execution environment resides in a service control point.

9. The system, as set forth in claim 1, wherein the service logic execution environment resides in a signal transfer point.

10. The system, as set forth in claim 1, wherein the service logic execution environment resides in a service switching point.

11. The system, as set forth in claim 1, wherein the service logic execution environment resides in an intelligent peripheral.

12. The system, as set forth in claim 1, wherein the SLP and SMP toolkits reside in a service creation environment.

13. The system, as set forth in claim 1, wherein the service management program comprises a billing template.

14. The system, as set forth in claim 1, wherein the service management program comprises a call detailed record template.

15. The system, as set forth in claim 1, wherein the service management program comprises network management data.

16. The system, as set forth in claim 1, wherein the service management program comprises network node performance metrics.

17. The system, as set forth in claim 1, wherein the service management program comprises customer support data.

18. The system, as set forth in claim 1, wherein the service management program comprises marketing sales information.

19. The system, as set forth in claim 1, wherein the service management program comprises customer information, subscription data, and service documentation.

20. The system, as set forth in claim 1, wherein the service logic program comprises a database schema for organizing data operated on by the service logic program in the service logic execution environment.

21. The system, as set forth in claim 1, wherein the service logic program comprises service provisioning scripts.

22. A method for commissioning telecommunications services, comprising:
   building a service logic program;
   building a service management program, the service management program implementing a support service for the service logic program;
   distributing the service logic program and service management programs to at least one service logic execution environment, residing in a telecommunications network node, and to at least one management logic execution environment;
   executing the service logic program to implement a new service; and
   executing the service management program to support the new service.

23. The method, as set forth in claim 22, further comprising the step of packaging the service logic program and service management program into a service definition package for distribution.

24. The method, as set forth in claim 23, further comprising the step of downloading the service definition package to a distribution network node for distribution to the service logic execution environment and management logic execution environment.

25. The method, as set forth in claim 22, wherein the step for building a service logic program comprises the step of specifying a database schema defining a database structure for data to be operated on by the service logic program in the service logic execution environment.

26. The method, as set forth in claim 22, wherein the distribution step comprises the step of distributing the service logic program and service management program to a service management system in the telecommunications network.

27. The method, as set forth in claim 22, further comprising the step of interpreting the service logic program prior to execution in the service logic execution environment.

28. The method, as set forth in claim 22, wherein the step of distributing the service logic program comprises the step of distributing the service logic program to a service logic execution environment residing in a service control point.

29. The method, as set forth in claim 22, wherein the step of distributing the service logic program comprises the step of distributing the service logic program to a service logic execution environment residing in a service transfer point.

30. The method, as set forth in claim 22, wherein the step of distributing the service logic program comprises the step of distributing the service logic program to a service logic execution environment residing in a service switching point.

31. The method, as set forth in claim 22, wherein the step of distributing the service logic program comprises the step of distributing the service logic program to a service logic execution environment residing in an intelligent peripheral.

32. The method, as set forth in claim 22, wherein the step of building the service management program comprises the step of using a billing template.

33. The method, as set forth in claim 22, wherein the step of building the service management program comprises the step of using a call detailed record template.

34. The method, as set forth in claim 22, wherein the step of building the service management program comprises the step of specifying network management data.

35. The method, as set forth in claim 22, wherein the step of building the service management program comprises the step of specifying network node performance metrics.

36. The method, as set forth in claim 22, wherein the step of building the service management program comprises the step of specifying customer support data.

37. The method, as set forth in claim 22, wherein the step of building the service management program comprises the step of specifying marketing sales information.

38. The method, as set forth in claim 22, wherein the step of building the service management program comprises the step of specifying customer information, subscription data, and service documentation.

\* \* \* \* \*